(12) United States Patent
Temple

(10) Patent No.: US 7,103,978 B1
(45) Date of Patent: Sep. 12, 2006

(54) TOOL AND METHOD FOR STRIPPING SHEATH FROM A CABLE

(76) Inventor: Larry D. Temple, P.O. Box 2105, Willits, CA (US) 95490

( * ) Notice: Subject to any disclaimer, the term of this patent is extended or adjusted under 35 U.S.C. 154(b) by 289 days.

(21) Appl. No.: 10/761,057

(22) Filed: Jan. 20, 2004

(51) Int. Cl.
*B26B 27/00* (2006.01)

(52) U.S. Cl. .......................... 30/90.1; 30/90.4

(58) Field of Classification Search ........... 30/90.1, 30/90.4, 90.8, 90.9, 286, 92.5; 29/564.4; 81/9.4
See application file for complete search history.

(56) References Cited

U.S. PATENT DOCUMENTS 3,091,031 A * 5/1963 Grant ..................... 30/90.7

* cited by examiner

*Primary Examiner*—Derris H. Banks
*Assistant Examiner*—Sean Michalski
(74) *Attorney, Agent, or Firm*—Robert Samuel Smith

(57) ABSTRACT

A tool and method for using the tool to strip a sheath from an end of the cable wherein the tool includes a tube; a cylindrical plunger slideably positioned in the tube; a yoke having a U shape. The yoke is attached to and spaced from one end of the tube and is aligned with the tube to permit that one end of the plunger, sliding toward the yoke, passes between legs of the yoke. A spring biases the plunger toward the yoke. A knife; clipped to the yoke, is arranged to cut a longitudinal cut in an end section of the sheath, positioned between the legs of the yoke and forced by the plunger against the knife. A handle having one end secured to the plunger, is accessible for withdrawing the plunger from the yoke to permit positioning the cable in the yoke.

6 Claims, 2 Drawing Sheets

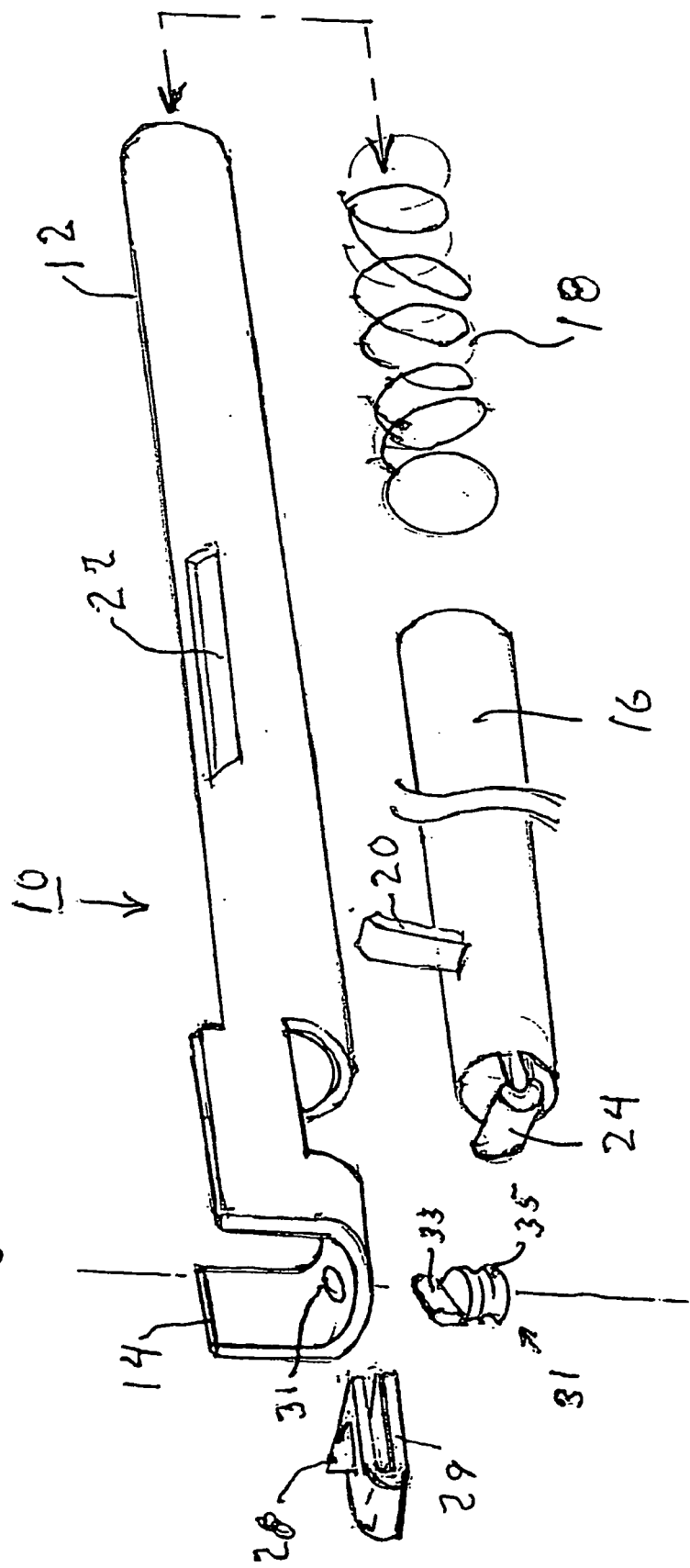

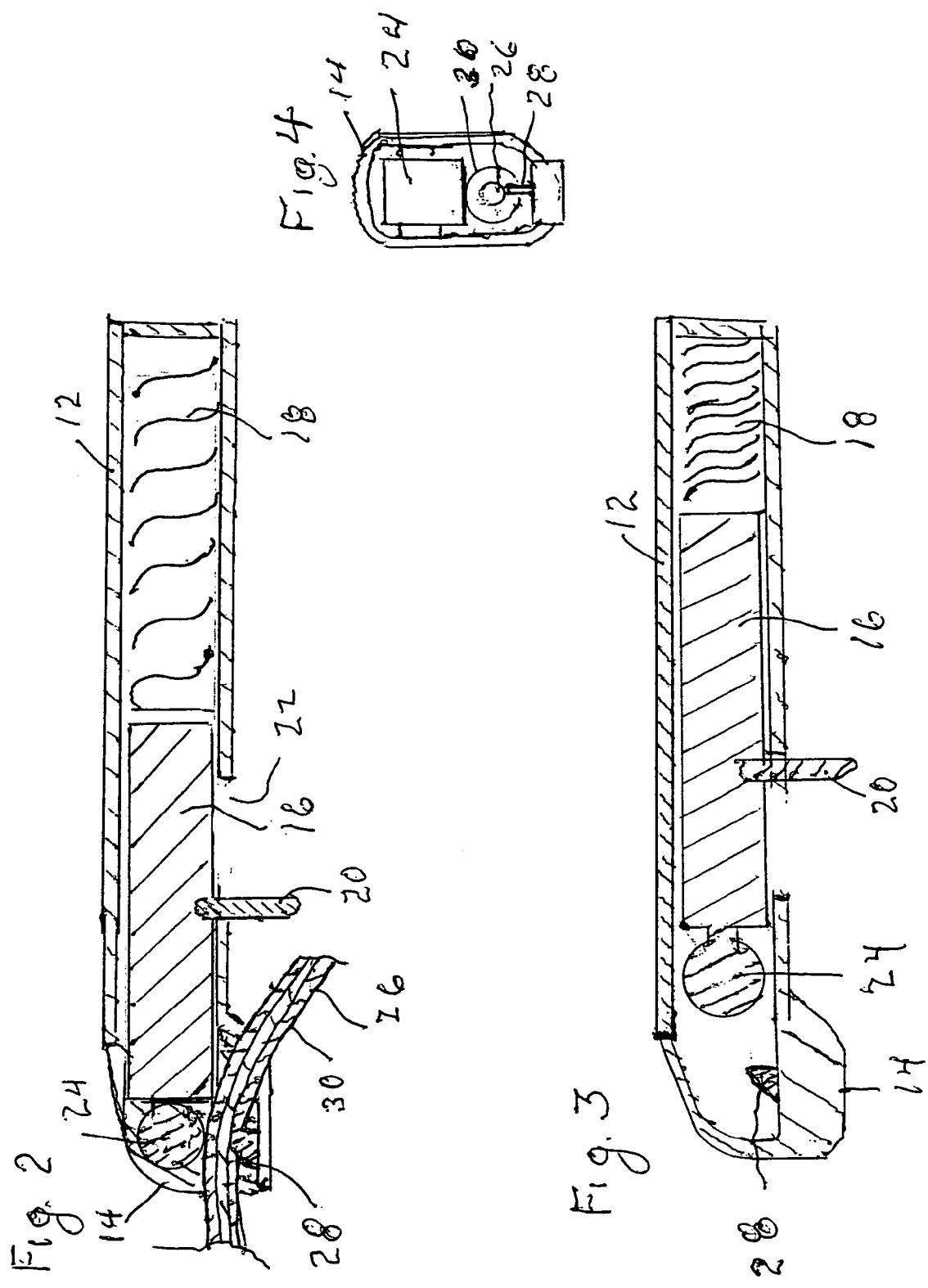

TOOL AND METHOD FOR STRIPPING SHEATH FROM A CABLE

FIELD OF THE INVENTION

This invention relates to strippers for removing insulating shields from wire and cable and particularly to a wire stripper for removing the insulating shield from ROMEX cable.

BACKGROUND AND INFORMATION DISCLOSURE

The typical electrical cable is a bundle of two or more wires, each of which has an elastomeric coat. The bundle of coated wires is encased in a tough sheath. A frequent chore involved in installing such electrical cables is the requirement to strip the sheath, usually about four to six inches from the end of the cable. For many years, the electrician used a knife to peel the sheath from the cable.

Using a knife to peel the sheath without cutting the coating on the wire required considerable care and effort and led to the development of a number of stripping tools.

U.S. Pat. No. 5,673,486 to Brown discloses a stripper having a rotatable cutting head with a cutting blade carrier block that pivots between an operative and inoperative position. The cutting head forms annular slits which form annular slugs that are removed after the wire is withdrawn from the device.

U.S. Pat. No. 5,7132,249 to Liversidge discloses a main body having a pair of clamping jaws and a pair of stripping jaws and an actuator to effect linear sliding motion of the stripper jaws.

U.S. Pat. No. 6,018,873 to McClellan discloses a stripper including a plurality of replaceable blades and an indented guide surface having a slot having a width selectable according to the size of the wire.

U.S. Pat. No. 6,079,105 to Hollingsworth discloses a tool having a blade carrying portion attached to a first portion of a handle and guide portion. The guide portion includes a channel defining a longitudinal axis and a blade. The blade is pivotable between a first cutting direction and a second cutting direction.

U.S. Pat. No. 6,330,839 to Amrein discloses means for compressing the exposed shielding to deform the shield to assume a donut shape. A cutting unit is movable transversely to a longitudinal orientation and shears off circular sections of the shielding portion.

SUMMARY OF THE INVENTION

It is an object of this invention to provide a tool that forms axially directed slits in cable sheath preparatory to stripping the sheath from the cable.

It is contemplated that the length of the slit be easily measured and controlled.

It is another object that the use of the tool inherently requires less effort than characterizes stripping tools of the current art.

It is another object that the the stripping tool be pulled with relative ease.

This invention is directed toward a stripper designed to slit the jacket of a cable in the axial direction. The stripper is a tube having a yoke on one end. A replaceable knife is mounted in the yoke with the blade parallel to and pointing toward the axis of the tube. When the cable is positioned in the yoke, a spring loaded plunger inside the handle forces the cable against the knife. The user pulls the cable away from the end of the tube in order to cut the jacket of the cable. A roller mounted in the end of the plunger against the cable reduces the force required to pull the cable while cutting the cable. The plunger is retracted to release the cable by pulling on a handle atached to the plunger and extending out through a slot in the tube.

BRIEF DESCRIPTION OF THE DRAWINGS

FIG. 1 is a persepctive exploded view of the tool of this invention.

FIG. 2 is a sectional view of the tool showing the cable in position for slitting the sheath.

FIG. 3 is a sectional view of the tool showing the plunger retracted from the yoke to permit positioning the cable in the yoke as shown in FIG. 2.

FIG. 4 is an end view of the tool showing the cable (in section) in position for slitting the sheath.

DESCRIPTION OF A PREFERRED MODE

Turning now to a discussion of the drawings, FIG. 1 is a perspective exploded view of tool 10 of this invention.

There is shown the tube 12 with a yoke 14 mounted on one end. A plunger 16 is slideably positioned inside the tube. The plunger 16 is biased toward the yoke by a spring 18 inside the tube 12. A lever 20 has one end secured to the plunger 16 through a slot 22 in the tube 12 for retracting the plunger 16 after the cable is cut. A roller 24 is mounted on the end of the plunger 16. The axis of the roller 24 is perpendicular to the axis of the tube 12.

A knife 28 is mounted on a clip 29 that clips (slides onto) the yoke 14.

FIG. 3 is a sectional view showing the plunger 16 withdrawn to permit positioning the cable 26 (FIG. 2) in the yoke 14. FIG. 2 is a sectional view showing the roller 24 on the end of plunger 16 biased by spring 16 to force the cable 26 against the knife blade 28.

FIG. 4 is an end view of the stripper showing a secional view of the cable 26 with the knife 28 penetrating the sheath 30 of the cable 26.

When the cable is in position against the blade, the handle is pulled in the direction of arrow A thereby slitting the cable in the axial direction. The cable is then released from the yoke by forcing the handle attached to plunger away from the yoke end of the tube.

After the sheath on the end of the cable is slit, the sheath is very conveniently peeled back and cut circumferentially around the cable with a knife.

FIG. 5

1. Provide the tool of this invention.
2. Retract the plunger from the yoke.
3. Position the yoke of the tool over the end of the cable. With the cable oriented with the end of the cable pointing away from the tube handle of the tube.
4. Release the handle to permit the plunger to slide toward the yoke whereby the cable is forced into contact with the knife and the knife penetrates the sheath.
5. Pull the tool away from the cable whereby the knife forms a longitudinal slit in the section of the sheath.
6. Apply force to the lever to release the tool from the cable.
7. Peel the section of sheath from the cable and cut the section away from the cable.

FIG. 5 is a flow chart for practicing the method of this invention for stripping a section of sheath from the end of a cable.

In step 1, provide the tool of this invention.

In step 2, retract the plunger from the yoke.

In step 3, position the yoke of the tool over the end of the cable. With the cable oriented with the end of the cable pointing away from the tube handle of the tube.

In step 4, release the handle to permit the plunger to slide toward the yoke whereby the cable is forced into contact with the knife and the knife penetrates the sheath.

In step 5, pull the tool away from the cable whereby the knife forms a longitudinal slit in the section of the sheath.

In step 6, apply force to the lever to release the tool from the cable.

In step 7, peel the section of sheath from the cable and cut the section away from the cable.

There has been described a cable stripper that provides a convenient method fo cutting a longitudinal slit in the sheath of a cable. The device provides several advantages compared to devices of the prior art.

The device is particularly useful for peeling back the sheath of a cable that is extending only a few inches out of a conduit box. In this situation, it is very easy to slip the end of the cable through the yoke of the tool, force the plunger against the cable only an inch or so from the end of the cable, and pull on the tool to cut the sheath.

Another advantage is that the depth of the cut is carefully maintained so that the blade cuts no deeper than the thickness of the sheath.

Another advantage is that the roller reduces the force required to pull the cable.

Another advantage is that the direction of pull is toward the user. The user can exert force more easily than when pushing away from himself or to one side.

Variations and modifications of this invention may be contemplated after reading the description and studying the drawings that are within the scope of the invention.

For example, FIG. 1 shows an aternative method for mounting a cutter 31 onto the yoke 14 at the end of tube 12. Cutter 31 is a blade 33 mounted onto the end of a short screw 35 that is screwed into a threaded hole 37 on yoke 14.

I therefore wish to define the scope of my invention by the appended claims.

I claim:

1. A tool for stripping a sheath from an end of a cable which comprises:
   a tube;
   a cylindrical plunger slideably positioned in said tube;
   a yoke being a strip formed into a U shape having one leg parallel to another leg and a portion of said strip with one end integrally joined to an end of one leg and another end of said portion integrally joined to an end of said another leg;
   said yoke having one of said legs integrally joined to an end of said tube by another strip extending from an end of said tube;
   a spring between another end of said plunger and a closed end of said tube arranged to bias said plunger toward said yoke;
   a knife:
   a hairpin strip operably attached to said knife and clippable onto said portion of said yoke arranged to permit mounting said knife onto said portion of said yoke arranged for cutting a longitudinal cut in a section of said sheath when said section is operably positioned between said legs of said yoke and forced by said plunger against said knife.

2. The tool of claim 1 further comprising a handle having one end secured to said plunger and extending through a slot in said tube arranged to permit a user to withdraw said plunger from said yoke.

3. The yoke of claim 1 further comprising a roller mounted on said one of said plunger with an axis of rotation perpendicular to said plunger and operably arranged to contact a cable positioned between Igs of said yoke providing that when said cable is pulled through said yoke in a direction away from said tube and roller the roller facilitates drawing said cable away through said yoke.

4. A tool for stripping a sheath from an end of a cable which comprises:
   a tube;
   a cylindrical plunger slideably positioned in said tube;
   a yoke being a strip formed into a U-shape having one leg parallel to another leg and a portion of said strip with one end integrally joined to an end of one leg and another end of said portion integrally joined to another end of said another leg;
   said yoke having one of said legs integrally joined to an end of said tube by another strip extending from an end of said tube;
   said yoke aligned with said tube to permit that one end of said plunger, sliding toward said yoke passes between said legs;
   a spring between another end of said plunger and a closed end of said tube arranged to bias said plunger toward said yoke;
   a knife;
   a hairpin strip operably attached to said knife and clippable onto said portion of said yoke operably arranged for cutting a longitudinal cut in a section of said sheath when said section is operably positioned between said legs of said yoke and forced by said plunger against said knife;
   a handle having one end secured to said plunger and extending through a slot in said tube arranged to permit a user to withdraw said plunger from said yoke;
   a roller mounted on said one end of said plunger with an axis of rotation perpendicular to said plunger and operably arranged to contact a cable positioned between legs of said yoke providing that when said cable is pulled through said yoke in a direction away from said tube and roller the roller facilitates drawing said cable away through said yoke.

5. A method for stripping a section of a sheath from and end of a cable which includes the steps in operable order:
   provide the tool of claim 4;
   retract the plunger from the yoke;
   position the yoke of the tool over the end of the cable; said cable oriented with said end of said cable pointing away from said handle;
   release said handle to permit said plunger to slide toward said yoke whereby said cable is forced into contact with said knife and said knife penetrates said sheath;
   pull said tool away from said cable whereby said knife forms a longitudinal slit in said section of said sheath;
   apply force to said handle to release said tool from said cable;
   peel said section from said cable and cut said section away from said cable.

6. The tool of claim 1 wherein said knife is mounted by one of a screw and a hairpin strip assembly.

said knife mounted on an end of said screw;
said yoke having a threaded hole;
said knife, said screw, said threaded hole on said yoke arranged in operable combination for cutting a longitudinal cut in a section of said sheath when said section is operable positioned between said legs of said yoke, forced by said plunger against said knife, then pulled through said yoke.

* * * * *